(12) United States Patent
Matsumoto et al.

(10) Patent No.: US 7,250,602 B2
(45) Date of Patent: Jul. 31, 2007

(54) PROBE DEVICE

(75) Inventors: Takuya Matsumoto, Kyoto (JP); Yasuhisa Naitoh, Tsukuba (JP); Tomoji Kawai, Mino (JP)

(73) Assignee: Osaka University, Suita-shi (JP)

( * ) Notice: Subject to any disclaimer, the term of this patent is extended or adjusted under 35 U.S.C. 154(b) by 11 days.

(21) Appl. No.: 11/065,273

(22) Filed: Feb. 25, 2005

(65) Prior Publication Data
US 2005/0139770 A1 Jun. 30, 2005

Related U.S. Application Data

(63) Continuation of application No. PCT/JP03/03728, filed on Mar. 26, 2003.

(30) Foreign Application Priority Data
Aug. 26, 2002 (JP) .............................. 2002-245810

(51) Int. Cl.
G21K 27/00 (2006.01)
G01N 23/00 (2006.01)
G01N 21/00 (2006.01)
G01B 5/28 (2006.01)

(52) U.S. Cl. ...................... 250/310; 250/306; 250/307; 73/104; 73/105

(58) Field of Classification Search ................ 250/306, 250/307, 310, 423 F; 324/762, 719, 713, 324/750, 754; 73/104, 105
See application file for complete search history.

(56) References Cited

U.S. PATENT DOCUMENTS 5,267,471 A * 12/1993 Abraham et al. ............. 73/105
5,804,709 A * 9/1998 Bourgoin et al. ............. 73/105
5,883,705 A * 3/1999 Minne et al. ................. 355/71
6,006,594 A * 12/1999 Karrai et al. ................. 73/105
6,504,365 B2 * 1/2003 Kitamura .................... 324/244
6,515,274 B1 * 2/2003 Moskovits et al. .......... 250/216
6,583,412 B2 * 6/2003 Williams .................... 250/306
6,740,518 B1 * 5/2004 Duong et al. ............ 435/287.2
6,798,222 B2 * 9/2004 Tanaka et al. .............. 324/715
6,823,724 B1 * 11/2004 Kobayashi et al. ........... 73/105
6,873,163 B2 * 3/2005 Bonnell et al. ............. 324/719
6,942,771 B1 * 9/2005 Kayyem .................... 204/409
7,014,795 B2 * 3/2006 Grigorov et al. ........... 252/500
7,045,285 B1 * 5/2006 Kayyem et al. ............... 435/6
7,088,120 B2 * 8/2006 Matsumoto et al. ........ 324/762

(Continued)

OTHER PUBLICATIONS

Kawai Lab "(II) Nano-bio-science & Molecular devices", Jul. 17, 2004, <http://www.kawai.sanken.osaka-u.ac.jp/research_nanobio_en.html>.*

G. Coutourier et al., "A virtual non contact-atomic force mircoscope (NC-AFM): Simulation and comparison with analyticmodels", <http://www.edpsciences.org/articles/epjap/pdf/2001/08/ap01031.pdf>.*

(Continued)

*Primary Examiner*—Nikita Wells
*Assistant Examiner*—Bernard Souw
(74) *Attorney, Agent, or Firm*—Oblon, Spivak, McClelland, Maier & Neustadt, P.C.

(57) ABSTRACT

A probe device comprises a cantilever comprising a probe allocated to be opposed to a surface of a sample, means for feeding back a vibration amplitude value of the cantilever, thereby self-exciting and vibrating the cantilever at a predetermined frequency, means for applying a bias to the sample or the probe, and means for measuring a frequency shift caused by a charge-transfer force which acts between the cantilever and the sample.

6 Claims, 4 Drawing Sheets

U.S. PATENT DOCUMENTS

| | | | |
|---|---|---|---|
| 2002/0005481 A1* | 1/2002 | Williams | 250/306 |
| 2002/0092340 A1* | 7/2002 | Prater et al. | 73/24.02 |
| 2003/0160623 A1* | 8/2003 | Tanaka et al. | 324/719 |
| 2004/0051542 A1* | 3/2004 | Miles et al. | 324/754 |
| 2005/0009197 A1* | 1/2005 | Adams et al. | 436/164 |
| 2005/0121615 A1* | 6/2005 | Prater et al. | 250/343 |
| 2005/0139770 A1* | 6/2005 | Matsumoto et al. | 250/310 |
| 2006/0160136 A1* | 7/2006 | Xiang et al. | 435/7.1 |

OTHER PUBLICATIONS

Elizabeth A. Boer et al., "Models for quantitative charge imaging by atomic force micrsocopy", J. Appl.Phys.90 (6) 2001, pp. 2764-2772.*

A. S. Foster et al., "Stimulating atomic force microscopy imaging of the ideal anddefected TiO2 (110) surface", Phys. Rev. B68, 195410 (2003).*

Ryuji Nishi et al., "Non-contact atomic force microscopy study of atomic manipulation on an insulator surface by nanoindentation", Nanotechnology 17 (2006) S142-S147.*

Omicron Nanotechnology, Atomic resolved non-contact AFM imaging of Ge/Si(105) surface (Resultofthe month Jul. 2005).*

Yasuhisa Naito, et al., "Denka Idoryoku Kenbikyo/Bunko no Kaihatsu", (Development of Charge Transfer Force Microscopy/Spectroscopy), 2002 Nen (Heisel 14 Nen) Shunki Dai 49 Kai Oyo Butsurigaku Kankel Rengo Koenkal Koen Yokoshu, separate vol. 2, The Japan Society of Applied Physics, Mar. 27, 2002, 27a-P2-9, p. 667.

Yoicho Otsuka, et al., "A Nano Tester: A New Technique for Nanoscale Electrical Characerization by Point-Contact Current-Imaging Atomic Force Microscopy", Japanese Journal of Applied Physics, Jul. 1, 2002, vol. 41, Part 2, No. 7A, pp. L742-L744.

Masaaki Shimizu, et al., "Studies on Electronic Structures of Semiconductors by Atomic Force Microscopy", Journal of Chemical Physics, Jun. 22, 1999, vol. 110, No. 24, pp. 12116-12121.

Yasuhisa Naito, et al., "Denka Idoryoku Kenbikyo/Bunko no Kaihatsu", 2002 Nen (Heisel 14 Nen) Shuki Dai 63 Kai Oyo Butsuri Gakkai Gakujutsu Koenkal Koen Yokoshu, separate vol. 2, The Japan Society of Applied Physics, Sep. 24, 2002, 27a-ZQ-1, p. 580.

* cited by examiner

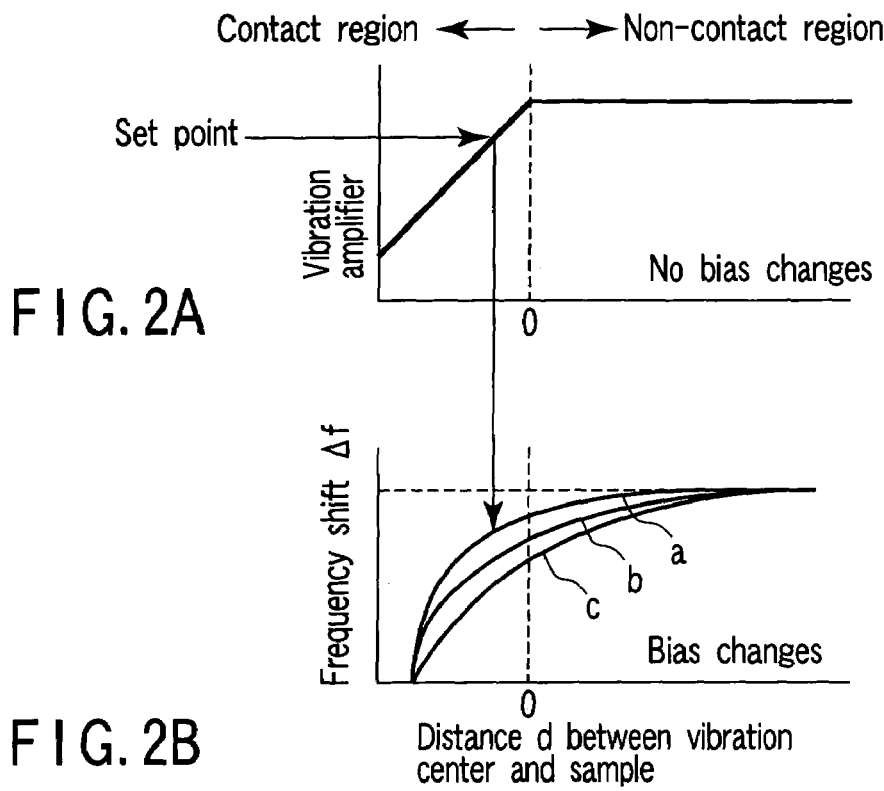
FIG. 2A
FIG. 2B
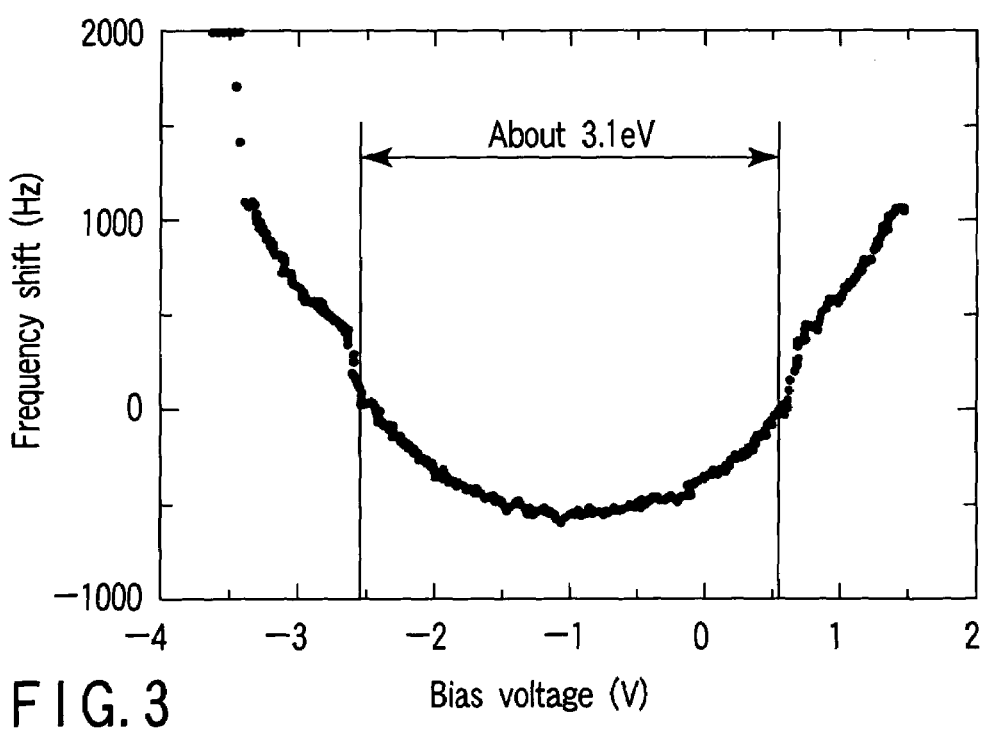
FIG. 3

PROBE DEVICE

CROSS-REFERENCE TO RELATED APPLICATIONS

This is a Continuation Application of PCT Application No. PCT/JP03/03728, filed Mar. 26, 2003, which was published under PCT Article 21(2) in Japanese.

This application is based upon and claims the benefit of priority from prior Japanese Patent Application No. 2002-245810, filed Aug. 26, 2002, the entire contents of which are incorporated herein by reference.

BACKGROUND OF THE INVENTION

1. Field of the Invention

The present invention relates to a probe device. More specifically, the present invention relates to a device for carrying out dopant analysis of a nano-device surface and a semiconductor; evaluation of a surface electronic state at a nano-scale of a sub-surface defect and a mezo-scopic substance etc.; and evaluation of electric conductivity.

2. Description of the Related Art

Conventionally, a measuring technique using a scanning tunnel microscope (STM) or a scanning tunnel spectroscopy (STS) is known as a technique for measuring a local electronic state in nano-scale orders of samples. In these techniques, however, it is necessary to detect a tunnel current which flows between a probe and a sample for feed back control to keep constant tip-sample separation. Thus, in the measuring techniques, only a sample having conductivity can be measured. This makes it difficult to measure an electronic state in nano-scale orders for a device structure such that a metal and an insulating material coexist. In addition, this makes it difficult to image its electronic state in a real space.

There is a measuring technique for measuring a current and a voltage while carrying out measurement with a contact-mode atomic force microscope (hereinafter, referred to as an "AFM") by using a conductive cantilever. In this method, however, because the probe and sample always come into contact with each other, the electronic state of the sample cannot be measured. As a result, a transport phenomenon of a whole system including a junction characteristic between the probe and the sample to be measured is evaluated.

In addition, in measurement with a contact-mode AFM, an object targeted for measurement is narrowed because a substance having a weak intimacy with a substrate such as a carbon nano-tube or a DNA is pushed away by the probe during measurement.

Therefore, in a conventional measuring method using an STS or an AFM, it is difficult to measure an electronic state for a sample in which an insulation surface coexists or a substance having a weak intimacy with a substrate surface.

Further, in recent years, a device structure represented by silicon has achieved significant high performance and downsizing, and has been developed so that its size reaches a size of nano-scale orders. If the device is thus of the size of nano-scale, there is a need for a technique for locally evaluating an electrical characteristic at a portion at which a predetermined function is provided in nano-scale orders. However, a metal and an insulator coexist in such a device structure itself, thus making it difficult to measure a local electronic structure of such a sample to be measured by a conventional scanning probe technique.

On the other hand, a technique for measuring an electronic state even on a surface on which the metal and insulator coexist as described above includes a technique for measuring a charge-transfer force by means of a force curve of the contact-mode AFM. In this measuring technique, however, it is necessary to evaluate a respective one of measurement points by analyzing a force curve on one by one basis. Thus, it takes very long time to carry out measurement, and it is difficult to measure an electronic state in nano-scale orders by fixing a sample at a predetermined point or to image the measurement result. By developing measurement of this charge-transfer force in a dynamic mode, it is believed to speed up measurement of a charge-transfer force and apply to local imaging easily. However, in a non-contact mode AFM utilizing a frequency shift for detection of a weak force, control of an tip-sample distance is made by a frequency shift which depends on a force, thus making it difficult to extract and measure a force change originating from the variation of tip-sample distance.

BRIEF SUMMARY OF THE INVENTION

It is an object of the present invention to provide an improved probe device, and further, a technique for measuring an electronic state of a substance in nano-scale orders and a technique for imaging the electronic state.

In the present invention, it is possible to measure an electronic state of a substance in nano-meter scales and to image the electronic state by preparing a novel measuring mode basically using a non-contact-mode AFM. An outline of the invention is as follows.

When a probe and a sample approach each other under a predetermined bias condition, an electron movement occurs due to a tunnel effect between the probe and the sample. Immediately after the electrons have moved, the side at which the electrons have been applied is charged in a positive direction, and the side at which the electrons have been received is charged in a negative direction. Then, an electrostatic attractive force acts between the probe and the sample. Since the tunnel effect which causes movement of the charge depends on an electronic state of the sample or probe, an electrostatic attractive force caused by movement of the charge as described previously also indicates a force which depends on the electronic state of the sample or probe. The electrostatic attractive force thus caused by movement of the charge is referred to as a "charge-transfer force". In a technique for measuring an electronic state using the charge-transfer force, it has been reported that measurement can be carried out by a force curve in a contact-mode AFM (refer to M. Shimizu et al., J. Chem. Phys. 110, 12116 (1999)). In this technique, however, a plurality of measurement points must be plotted while an applied voltage is changed. Therefore, in order to measure the electronic state of the sample, a tremendously large amount of time is required because a respective one of the measurement points must be analyzed from each force curve. Thus, it has been also difficult to image a local electronic structure of the sample.

Thus, according to the present invention, a cantilever which is an AFM probe is oscillated by self-excitation, and a feedback control of tip-sample distance is made based on a vibration amplitude value of the cantilever, whereby an electrostatic force between a probe and a sample is detected under a changed bias condition while an interval between the probe and a surface is constantly controlled. In this case, a force is detected by a deviation (i.e., a frequency shift) of a resonance frequency of the self-excited cantilever oscillation, and bias dependency of this frequency shift is measured. The measurement result reflects the electronic state of the sample, and the force scale changes according to the electronic state of the sample, thus making it possible to measure a local density of states of the sample. In this case, each force curve measurement in the existing technique corresponds to one period of the cantilever which vibrates in the invention, thus significantly speeding up measurement of the charge-transfer force.

The above-described method for measuring a local electronic state of a sample by using the technique of the invention is referred to as a "charge-transfer force spectroscopy". In addition, in the probe device according to the invention, a microscope for observing electron property of an electron at the same time when observing a surface structure of a sample is referred to as a "charge-transfer force microscope".

In the charge-transfer force microscope, by feeding back the vibration amplitude value of the cantilever, the electron properties such as density of states or electrical conductivity etc. of a surface of the sample can be measured at the same time when evaluating a topography of the sample surface. In this case, with respect to the electric conductivity, a charge for generating a force is scattered by the electrical conduction through the sample, and a electrification is more unlikely to occur as the electrical conduction of the sample is better. By utilizing this phenomenon, the electric conductivity of the measured sample is also reflected on the measurement points.

In addition, in the invention, feedback by the AFM is valid regardless of whether the conductivity of the sample is present or absent. Therefore, even in the case of a surface of an insulator which has not been successfully measured or in the case of a surface on which a thin insulator incapable of sensing a tunnel current exists, it becomes possible to measure a local electronic state of the sample.

As described above, according to the invention, even in the case of a sample including an insulator, a charge-transfer force can be evaluated at a high speed and while locally controlling an interval between the probe and the sample. Thus, the present invention is very effective for measurement of a local electronic state for a device structure in nano-scale orders.

BRIEF DESCRIPTION OF THE SEVERAL VIEWS OF THE DRAWING

FIGS. 2A and 2B are graphs each illustrating a principle of the probe device according to an embodiment of the invention.

FIG. 3 is a graph showing an example of an observation result by using the probe device according to an embodiment of the invention, the graph showing a measurement result of a reduced strontium titanate (STO) single crystal by using charge-transfer force spectroscopy.

DETAILED DESCRIPTION OF THE INVENTION

Hereinafter, an embodiment of the present invention will be described with reference to the accompanying drawings.

Figure 1:
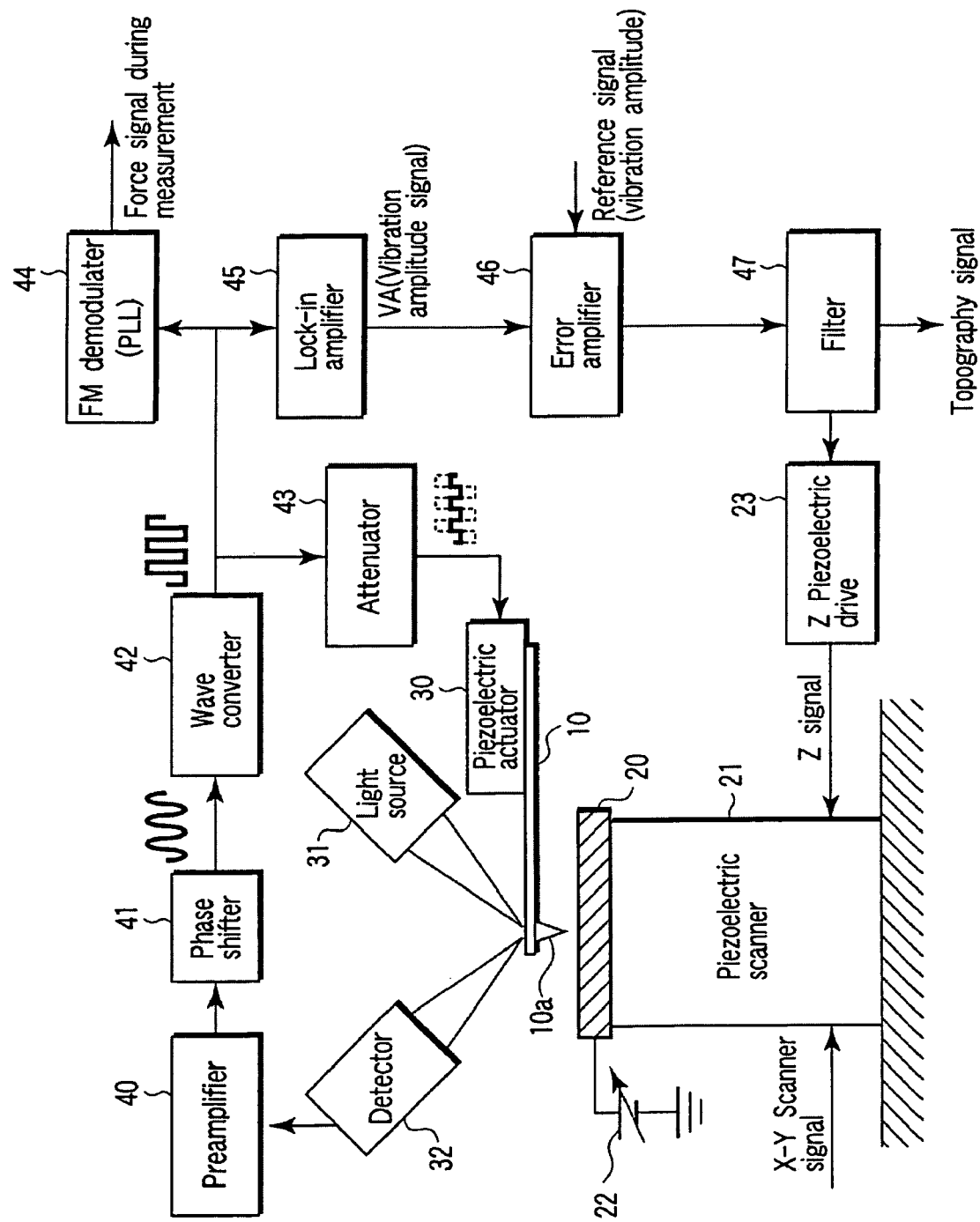
FIG. 1 is a diagram showing a general configuration of a probe device according to an embodiment of the present invention.

FIG. 1 is a diagram showing a general configuration of a probe device according to an embodiment of the present invention. In the following description, the probe device will be described by way of example of a generally used atomic force microscope.

As an atomic force microscope (AFM), there is utilized an AFM using a conductive cantilever 10 having a probe 10a. As shown in FIG. 1, at a position opposed to the probe 10a, a sample 20 is allocated on a piezoelectric scanner 21 so as to be movable on three axes. In addition, the sample 20 can be applied with a desired voltage by means of a bias 22 at which the applied voltage is variable. In the present specification, although an embodiment for applying a bias to a sample is described, such a bias may be applied to a probe.

The piezoelectric scanner 21 can be moved along an X-Y plane by an X-Y scanning signal, and it is possible to measure a surface state at a desired position. Further, the piezoelectric scanner 21 can be moved in a Z direction by inputting a Z signal from a Z piezoelectric drive section 23 described later in detail, and this Z signal makes it possible to maintain a distance between the sample 20 and the probe 10a to be constant.

A specific observing method will be described with reference to FIG. 1.

For example, the cantilever 10 energized by noise or the like starts vibration. The movement of the cantilever 10 is detected by an optical system configured of a light source 31 and a detector 32. The detected movement is converted into an electrical signal to be outputted to a preamplifier 40. For a synchronizing signal outputted from the preamplifier 40, a delay of an electrical measuring system is compensated for by a phase shifter 41. A signal outputted from the phase shifter 41 is converted into a rectangular wave signal by a waveform converter 42. The rectangular wave signal outputted from the waveform converter 42 is inputted to an attenuator 43, an FM demodulator 44, and a lock-in amplifier 45.

The attenuator 43 attenuates the inputted rectangular wave signal at a predetermined rate. This rectangular wave signal after attenuated is inputted to a piezoelectric actuator 30 of the cantilever 10, and the cantilever 10 automatically continues oscillation at the predetermined vibration amplitude. In this manner, the cantilever 10 carries out self-excitation and vibration.

The FM demodulator 44 comprises a phased locked loop (PLL) circuit. The rectangular wave signal inputted to the FM demodulator 44 is FM-demodulated, and a frequency shift $\Delta f$ serving as a force signal during measurement is detected.

A signal associated with the vibration amplitude value of the cantilever 10 is outputted by the rectangular wave signal inputted to the lock-in amplifier 45, and a difference with a reference signal is obtained by an error amplifier 46. Then, a signal outputted from the error amplifier 46 is outputted to a display section (output section), although not shown, as a sample surface image signal via a filter 47. In addition, a signal from the filter 47 is outputted to the Z piezoelectric drive section 23, and the movement of the sample 20 in the Z direction is controlled.

Subsequently, an electric potential difference between the probe 10a and the sample 20 is controlled by changing the voltage applied by the bias 22, thereby detecting a frequency shift in a local electronic state at each of the set voltages.

An operation in the above-described configuration will be described here.

The vibration amplitude value of the cantilever 10 is measured while the cantilever 10 is self-excited and oscillated as described above. Then, the vibration amplitude value is fed back as a force which acts between the sample 20 and the cantilever 10 and a frequency shift of the oscillation of the cantilever 10 is measured by the FM demodulator 44. At this time, the cantilever 10 enters a state in which it taps the surface of the sample 20 as in a tapping mode AFM.

The vibration amplitude value of the cantilever 10 changes according to a distance between a vibration center and a sample in the case where a set point is set as shown in FIG. 2A. However, the vibration amplitude value of the cantilever 10 does not appear as a change immediately with respect to an attractive force which acts between the probe 10a and the sample 20. Therefore, by making a feedback control at the vibration amplitude value, the position of the cantilever 10 can be set without being so affected by the magnitude of the charge-transfer force which is an attractive force acting between the probe 10a and the sample 20. In contrast, the value of the frequency shift measured at the same time when measuring the vibration amplitude value changes very sensitively in response to an attractive force. (For example, with a bias change, the frequency shift value changes from "a" to "c" of a graph shown in FIG. 2B). Thus, the magnitude of the charge-transfer force can be measured while the position of the cantilever 10 is defined.

Therefore, while the voltage applied to the sample 20 by the bias 22 is changed, the density of states of the sample 20 can be measured from the change of the bias voltage at a measurement point by measuring a frequency shift of a resonance frequency of the cantilever 10. Also, information relating to the above charge-transfer force can be imaged at the same time when imaging height information, thereby making it possible to observe the state density and electrical conductivity of the surface structure in a real space.

Now, a result of measurement according to the invention will be described here.

The measurements of an electronic state of a reduced strontium titanate single crystal and p-type and n-type silicon wafers were carried out as measurement targets. With respect to the probe device, there is shown a result of measurement of an electronic state distribution in nanometer scale orders on a hydrogen-terminated silicon wafer. Conditions for producing these samples targeted for measurement are as follows.

(1) Reduced Strontium Titanate Single Crystal

The crystal is prepared by heating a commercially available strontium titanate single crystal in a high vacuum chamber at 900° C. for one hour.

(2) p-Type and n-Type Silicon Wafers

These wafers are prepared by washing a commercially available silicon wafer (100) orientation with ethanol.

(3) Hydrogen-terminated Silicon Wafer

The wafer is produced by impregnating a commercially available silicon wafer (100) orientation in an aqueous hydrofluoric acid solution.

Figure 4A:
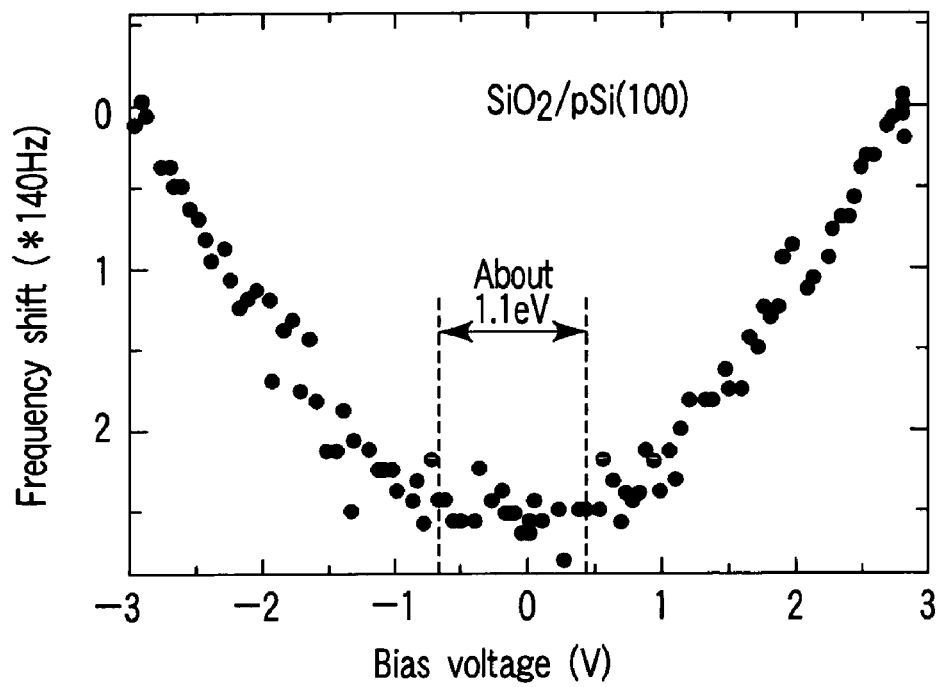
FIGS. 4A and 4B are graphs each showing an example of an observation result by using the probe device according to an embodiment of the invention, the graphs showing measurement results of silicon wafers (p type and n type) by using charge-transfer force spectroscopy.
Figure 4B:
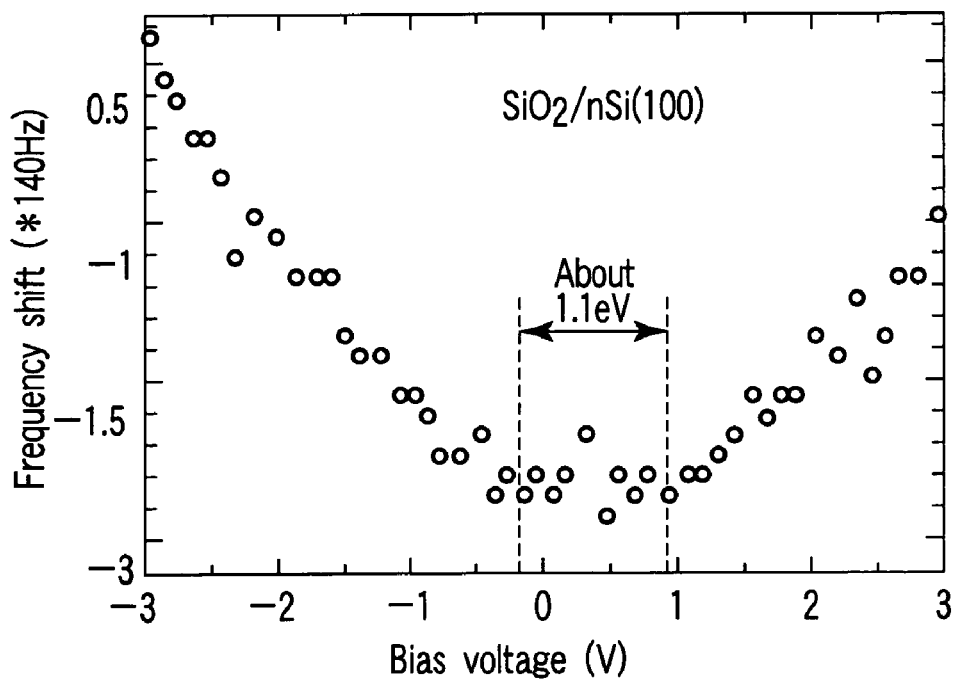
Figure 5:
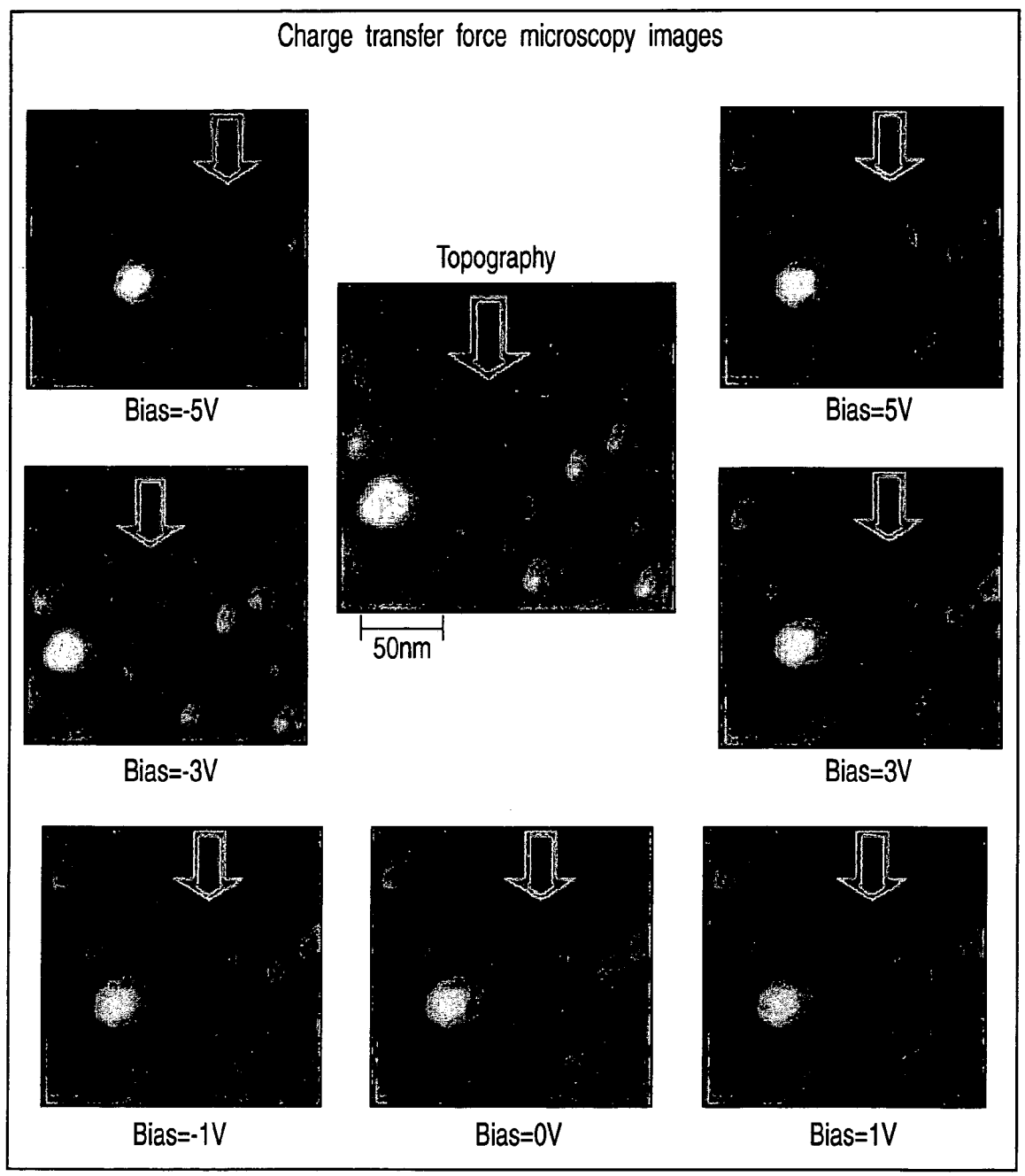
FIG. 5 is a view showing an example of an observation result by using the probe device according to an embodiment of the invention, the view showing topography and bias-dependent charge transfer image on a hydrogen-terminated silicon wafer.

The above test results are shown in FIGS. 3 to 5.

FIG. 3 is a graph showing a measurement result of an electronic state in a reduced strontium titanate single crystal, FIGS. 4A and 4B are graphs showing measurement results of an electronic state in p-type and n-type silicon wafers, respectively, and FIG. 5 is a view showing a measurement result of an electronic state distribution of a hydrogen-terminated silicon wafer. The measurement results of FIGS. 3, 4A and 4B are obtained in the case where a bias is changed by fixing a distance between the probe 10a and the sample 20 to a set point shown in FIGS. 2A and 2B.

According to FIG. 3, points at which a frequency shift value rapidly changes (referred to as "a discontinuousdiscontinuous point" in the present specification) are about −2.5 eV and about 0.5 eV, respectively. An electric potential difference between these discontinuous points is about 3 eV (expressed as about 3.1 eV in FIG. 3), and this value is obtained as a value which corresponds to a band gap in the reduced strontium titanate single crystal. Similarly, in FIGS. 4A and 4B as well, an electrical potential difference between discontinuous points is about 1.1 eV on the p-type and n-type silicon wafers, and this electrical potential difference is also obtained as a value which corresponds to a band gap of silicon. Therefore, the electronic state of the sample 20 can be measured by spectroscopy according to the above-described embodiment.

As described above, on a mixture surface between a metal and an insulator (device structure) as well, an electronic state can be measured by a charge-transfer force without depending on a tunnel current.

In addition, although FIGS. 4A and 4B each show a characteristic result of a silicon wafer, the silicon wafer does not undergone any special process other than washing. Thus, a silicon oxide layer covers a silicon surface with thickness of about 3 nm. Therefore, the density of states cannot be measured by the conventional scanning tunnel spectroscopy (STS) because a feedback is difficult in a tunnel current. In the spectroscopy according to the invention, on the other hand, a result obtained by reflecting an electronic state of silicon beneath the silicon oxide layer can be measured, and the sensitivity of measurement is higher than that using the STS.

FIG. 5 shows image examples in the case where a bias has changed from −5V to 5V. Thus, it is found that, even on a flat silicon wafer, a non-uniform portion exists as a density of states in nano-meter scale. Further, it is possible to actually measure that such non-uniformity is changed in shape by means of a measurement bias. FIG. 5 shows that the darker contrast is, the greater density of states is. In addition, the arrow in each image example of FIG. 5 indicates the same location.

The present invention is not limited to the above-described embodiment of the invention. Of course, various modifications can occur without departing from the spirit of the invention.

According to the invention, while a structure is checked in nano-scale, the electronic state or electrical conductivity at each point can be measured regardless of the presence or absence of electrical conductivity of a measured sample.

What is claimed is:

1. A probe device comprising:
    a cantilever comprising a probe allocated to be opposed to a surface of a sample;
    means for feeding back a deflection signal value of the cantilever, thereby self-exciting and vibrating the cantilever at a predominant frequency;
    means for applying a bias to the sample or the probe; and
    means for measuring a frequency shift caused by a charge-transfer force which acts between the cantilever and the sample.

2. A probe device according to claim 1, further comprising a piezoelectric element configured to mount the sample thereon and to move the sample in a first direction vertical to a surface of the sample, such that the vibration amplitude value of the cantilever is fed back to the piezoelectric element and thereby maintains a distance between the sample and the probe to be constant.

3. A probe device according to claim 2, wherein the piezoelectric element is configured to move the sample on a plane vertical to the first direction.

4. A probe device according to any one of claims 1 to 3, wherein the bias is variable.

5. A probe device according to any one of claims 1 to 3, wherein the means for measuring a frequency shift is configured to change the bias, and to control an electric potential difference between the probe and the sample, and thereby measure a frequency shift.

6. A probe device according to any one of claims 1 to 3, further comprising:

means for imaging information relating to the charge-transfer force based on the frequency shift when imaging height information.

* * * * *